United States Patent [19]

Bohanan et al.

[11] 3,998,692
[45] Dec. 21, 1976

[54] NUCLEAR REACTOR FOR BREEDING $U^{233}$

[75] Inventors: Charles S. Bohanan, Raleigh, N.C.; David H. Jones, Pittsburgh, Pa.; Harry F. Raab, Jr., Annandale, Va.; Alvin Radkowsky, Tel Aviv, Israel

[73] Assignee: The United States of America as represented by the United States Energy Research and Development Administration, Washington, D.C.

[22] Filed: Dec. 8, 1975

[21] Appl. No.: 638,228

Related U.S. Application Data

[62] Division of Ser. No. 486,786, July 9, 1974, Pat. No. 3,960,655.

[52] U.S. Cl. .................... 176/16; 176/18; 176/30
[51] Int. Cl.² .......................................... G21G 1/02
[58] Field of Search ................ 176/17, 18, 30, 14, 176/16

[56] References Cited

UNITED STATES PATENTS 3,671,392    6/1972    Beaudoin et al. .................... 176/18

Primary Examiner—Harvey E. Behrend
Attorney, Agent, or Firm—Dean E. Carlson; Arthur A. Churm; Frank H. Jackson

[57] ABSTRACT

A light-water-cooled nuclear reactor capable of breeding $U^{233}$ for use in a light-water breeder reactor includes physically separated regions containing $U^{235}$ fissile material and $U^{238}$ fertile material and $Th^{232}$ fertile material and $Pu^{239}$ fissile material, if available. Preferably the $U^{235}$ fissile material and $U^{238}$ fertile material are contained in longitudinally movable seed regions and the $Pu^{239}$ fissile material and $Th^{232}$ fertile material are contained in blanket regions surrounding the seed regions.

1 Claim, 5 Drawing Figures

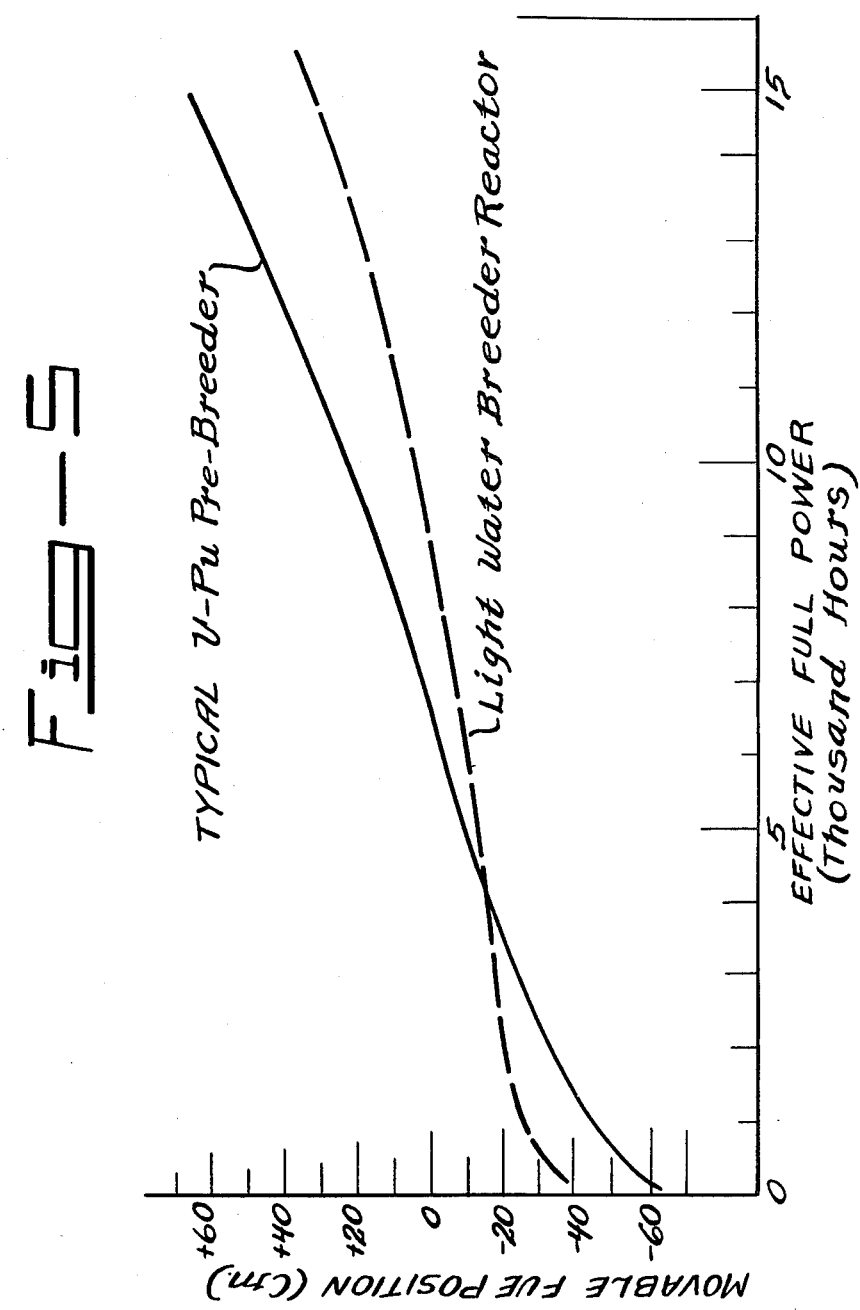

3,998,692

NUCLEAR REACTOR FOR BREEDING U²³³

CONTRACTUAL ORIGIN OF THE INVENTION

The invention described herein was made in the course of, or under, a contract with the UNITED STATES ATOMIC ENERGY COMMISSION.

This is a division, of application Ser. No. 486,786, filed July 9, 1974, now U.S. Pat. No. 3,960,655.

BACKGROUND OF THE INVENTION

This invention relates to a nuclear reactor. In more detail, the invention relates to a reactor which is useful for breeding uranium-233 for use in a light-water breeder reactor.

The design of light-water reactors capable of self-sustained breeding has been extensively studied at Bettis Atomic Power Laboratory. These designs all include a heterogeneous array of rods fueled with $(U^{233}, Th)O_2$ pellets with a moderator and coolant of light water. The designs also have as a common feature the use of a movable fuel region coupled with some form of axial fuel variation to attain reactivity control. One such design is described in detail in patent application Ser. No. 461,475, filed Apr. 16, 1974, now U.S. Pat. No. 3,957,575.

Before any large-scale development of $(U^{233}, Th)O_2$ reactors can occur, it is necessary to develop an efficient means of obtaining large quantities of the fissile isotope $U^{233}$. The only method by which $U^{233}$ can be obtained in quantity is by the conversion of $Th^{232}$ to $U^{233}$. This requires the development of an efficient reactor which is fueled with available fuel and in which conversion of $Th^{232}$ to $U^{233}$ can be carried out. One such reactor which has been proposed is a reactor which uses only plutonium fissile fuel but operation of such a reactor is totally dependent on fissile fuel which must also be produced in a reactor. Another such reactor uses $U^{235}$ as fuel with a low-cost diluent such as $ZrO_2$ but such a reactor has a low thorium conversion ratio. Still another such reactor forms the subject matter of the present application.

SUMMARY OF THE INVENTION

According to the present invention, breeding of $U^{233}$ for use in a light-water thermal reactor capable of self-sustained breeding is accomplished in a reactor fueled with $U^{235}$ with $U^{238}$ diluent and $Pu^{239}$ fuel, if available, plus $Th^{232}$ diluent. The fertile material $Th^{232}$ is physically separated from the $U^{235}$ and is preferably mixed with $Pu^{239}$ to improve $Th^{232}$ conversion to $U^{233}$. A preferred design includes longitudinally movable seed regions containing the $U^{235}$ and $U^{238}$ which are surrounded by $Pu^{239}$-$Th^{232}$ blanket regions. The seed material is capped with natural $UO_2$ and the blanket fuel with $Th^{232}O_2$ to reduce neutron leakage.

BRIEF DESCRIPTION OF THE DRAWINGS

FIG. 5 is a graph showing the critical positions of the movable seed of the pre-breeder design of the present invention as well as for a typical light-water breeder reactor as a function of core lifetime.

DESCRIPTION OF THE INVENTION

Figures 1, 4:
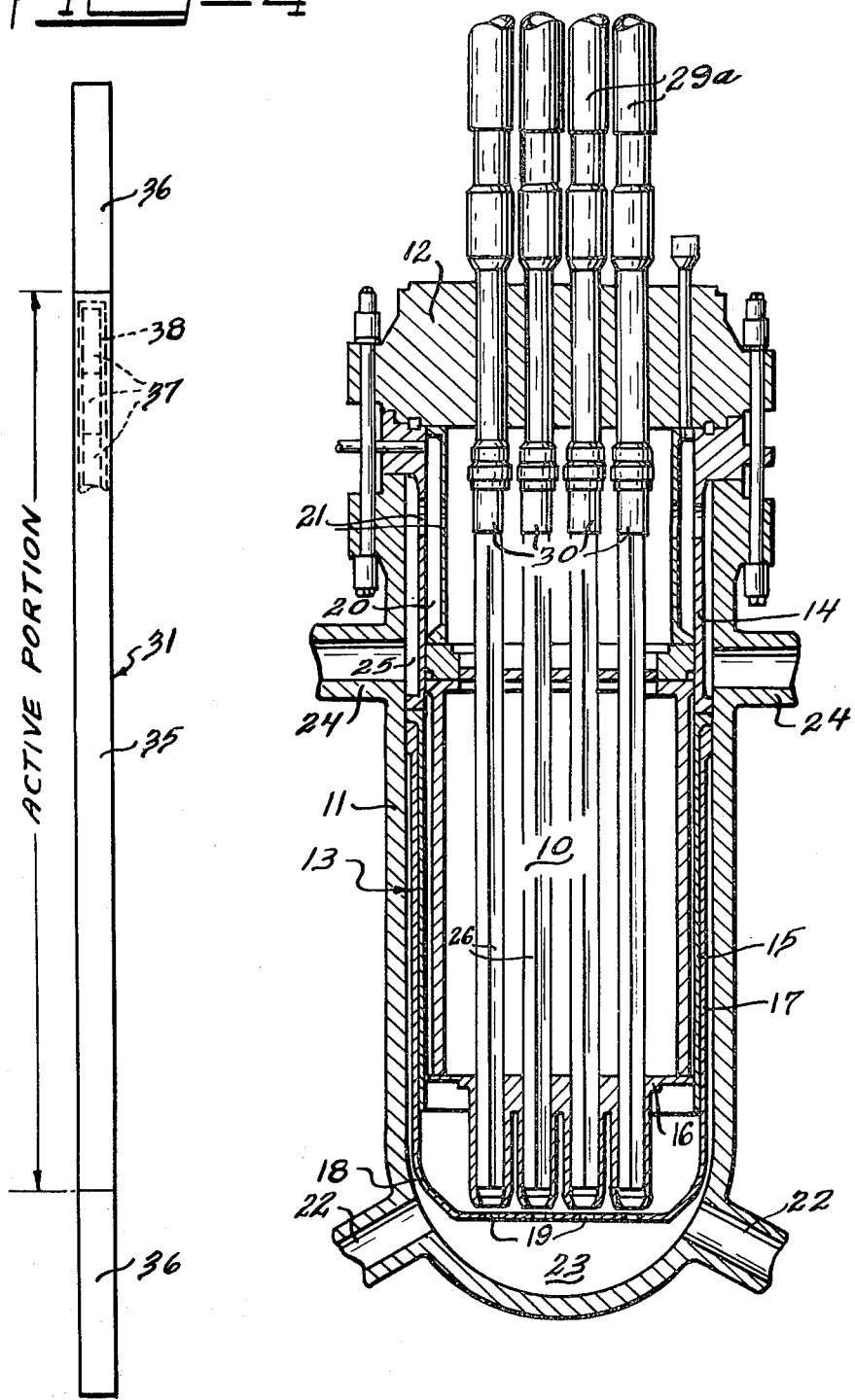
FIG. 1 is a vertical section of a nuclear reactor incorporating the present invention.
FIG. 4 is a schematic of a fuel rod.

The primary purpose of the pre-breeder reactor of the present invention is to produce fissile $U^{233}$ for use in a breeder reactor. A reactor which accomplishes this is characterized by the following design parameters:

1. The $U^{235}$-enriched regions of the core should be designed such that the initial hydrogen-to-$U^{235}$ atomic ratio is between 10.0 and 150.0 and the initial $U^{235}$ to $U^{238}$ ratio is between 0.005 and 0.20.

2. The plutonium-enriched regions of the core should be designed such that the initial plutonium-to-hydrogen atomic ratio is between 0.0 and 0.015 and the equilibrium ratio is between 0.002 and 0.015. The initial plutonium-to-$Th^{232}$ ratio should be between 0.0 and 0.03 and the equilibrium ratio between 0.005 and 0.03.

3. The binary fuel compositions shall occupy from 30 to 95% of the core volume.

4. There will initially be at least two distinct fuel compositions. One composition shall contain thorium, possibly mixed with plutonium, and at least one composition shall contain a mixture of uranium with $U^{235}$ as the principal fissile isotope and $U^{238}$ as the diluent.

5. The fuel materials may be composed of (a) uranium or plutonium metal or metal alloys, (b) uranium or plutonium oxide with or without diluents of uranium oxide, thorium oxide, beryllium oxide or other low cross section oxides, (c) uranium or plutonium carbide with or without a diluent of uranium carbide, thorium carbide or a low cross section carbide diluent.

6. Whenever plutonium fuel is being used the isotopic mix may vary as the sources vary, but each plutonium composition must contain at least 60% of the fissile isotopes $Pu^{239}$ or $Pu^{241}$.

With the use of both $U^{235}$—$U^{238}$ and $Pu^{239}$—$Th^{232}$ fuels, the reactor described herein may be employed under a wide variety of economic or technical constraints. If plutonium is not available in large quantities, then it would be possible to operate for a cycle with no plutonium in the thorium. In a later cycle the plutonium produced from the $U^{235}$ of the first cycles could be used in the thorium fuel to improve conversion performance. Conversely, if a large amount of plutonium were available and the criteria of prime importance were the efficient utilization of plutonium already available rather than efficient over-all fuel utilization, then more plutonium could be used from the beginning of the first cycle of the pre-breeder to accelerate its conversion into a breeder. Thus, the invention describes a pre-breeder concept which is viable in almost any future economic environment.

As shown herein, a combination of $U^{235}$ and $Pu^{239}$ as fissile materials and $Th^{232}$ and $U^{238}$ as fertile materials can be employed in such a way that 1. power comparable to a breeder is achieved
2. lifetime comparable to a breeder is achieved
3. conversion of $Th^{232}$ to $U^{232}$ is achieved
4. some amount of makeup plutonium is achieved
5. the materials are produced in core regions such that only chemical separation of materials is required
6. The design of the pre-breeder is mechanically the same as that of the light-water breeder reactor mentioned hereinbefore and 7. the use of different combinations of fuels can result in different fuel utilizations over a range of economic conditions.

The advantages of this design are:
1. The invention provides an efficient method of generating $U^{233}$ for use in light-water breeder reactors.
2. Fissile plutonium is used in the thorium fuel to enhance $U^{233}$ conversion but the amount of plutonium used may be varied to strike any balance desired between over-all fuel utilization and the time required to achieve a full breeder reactor.
3. The invention provides a useful market for the plutonium currently being produced by light-water reactor plants without being dependent on that external plutonium source.
4. Because of its flexible plutonium usage, the invention can be economically optimized over a wide range of economic environments.
5. The invention has the capability of being used as a replacement core in existent light-water reactor plants.
6. Mechanically, the invention is of essentially the same design as light-water breeder reactors, simplifying conversion to breeding.

To demonstrate the ability of the uranium-plutonium pre-breeder concept to achieve its goal of a high conversion ratio while producing a significant amount of power and attaining a reasonable lifetime, a typical design will be described. The typical design discussed herein is included only for illustrative purposes. It is not the only possible pre-breeder design, nor is it an optimal design since the possibility of a reduction in the fissile fuel loading or an improved conversion ratio exists.

As shown in the drawing, a nuclear reactor incorporating the present invention comprises a core 10 enclosed within a pressure vessel 11 provided with a closure head 12. Core 10 is disposed within core cage assembly 13 which includes upper core barrel 14, lower core barrel 15 and bottom plate assembly 16. Inlet baffle shield barrel 17 is disposed between lower core barrel 15 and pressure vessel 11 and terminates in inlet flow baffle 18 having a plurality of openings 19 therein which allow coolant to circulate therethrough. Also forming a part of core cage assembly 13 is holddown barrel 20 which is inside of upper core barrel 14 and prevents upward movement of the reflector due to water flowing upwardly therethrough. The upper section of holddown barrel 20 and upper core barrel 14 contain slots 21 to provide for coolant exit from the core and to provide for differential thermal expansion. Pressure vessel 11 is provided with four inlet nozzles 22 communicating with a lower plenum 23 below and outside of baffle 18 and four outlet nozzles 24 communicating with an upper plenum 25 which communicates with slots 21.

Figure 2:
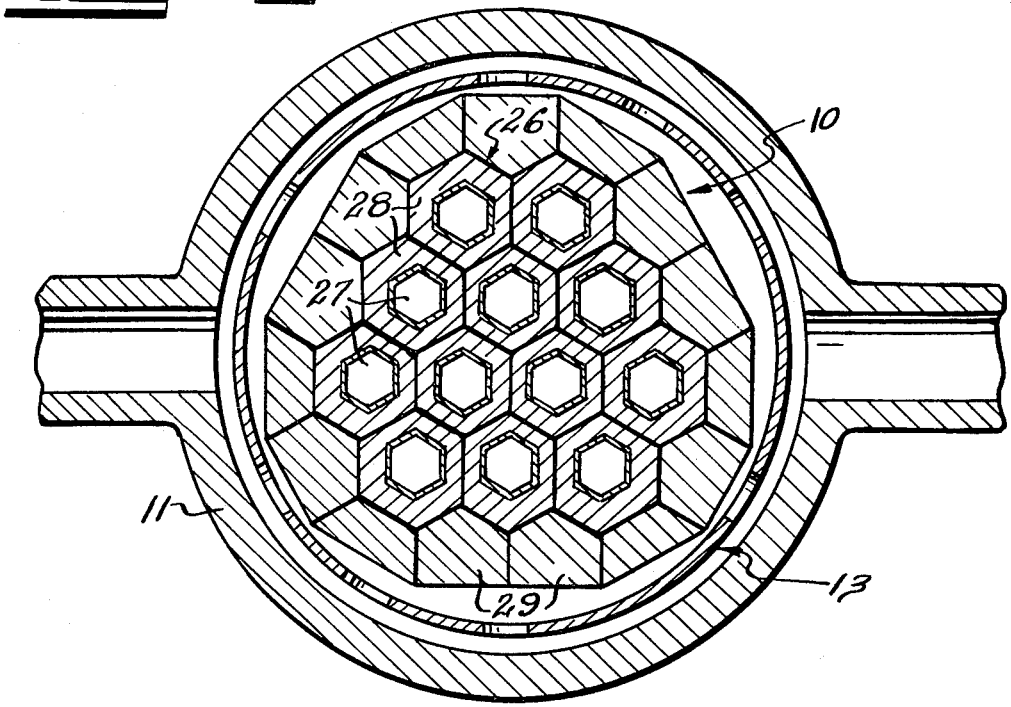
FIG. 2 is a horizontal section thereof taken through the reactor core.
Figure 3:
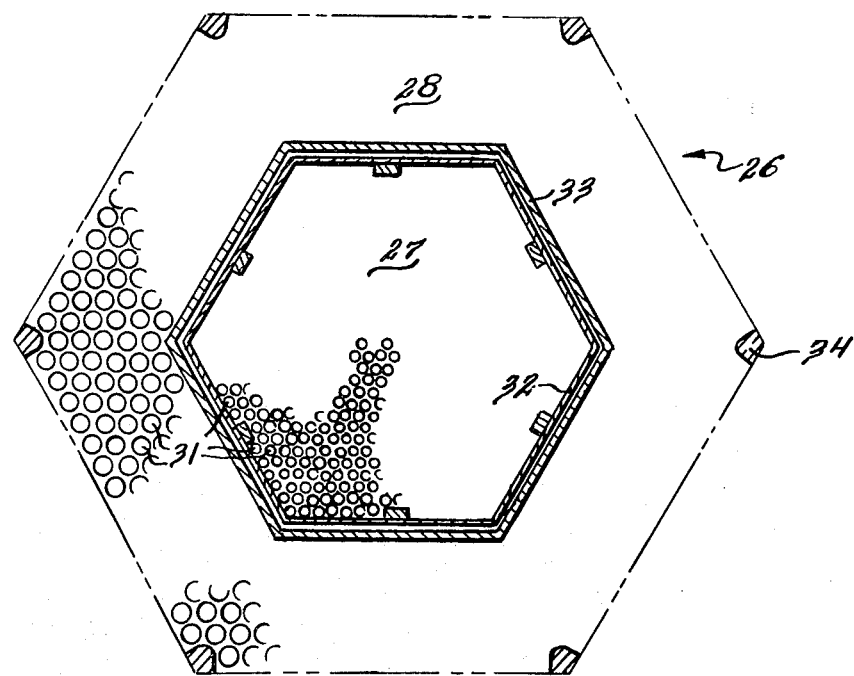
FIG. 3 is an enlarged horizontal section taken through a single fuel module.

As more particularly shown in FIG. 2, core 10 includes a plurality of fuel modules 26, each including a hexagonal seed assembly 27 surrounded by a hexagonal annular blanket assembly 28. Reflector modules 29 surround blanket assemblies 28 to complete the core 10. Seed assemblies 27 are moved longitudinally with respect to blanket assemblies 28 by control mechanisms 29a (FIG. 1) to control the reactor. Blanket assemblies 28 are supported by support tubes 30 which are suspended from closure head 12 and seed assemblies 27 are supported by the control mechanism 29a through lead screws (not shown).

Further details of the mechanical structure of this reactor will not be described because they form no part of the present invention. For these details reference is made to U.S. Pat. No. 3,957,575, supra.

Each seed assembly 27 includes a plurality of parallel, elongated fuel rods 31 disposed in triangular array within an hexagonal shell 32 which separates coolant flow in the seed from coolant flow in the blanket. Each blanket assembly 28 includes a plurality of parallel, elongated fuel rods 31 disposed in triangular array in an hexagonal annulus around a seed assembly 27. Six rows of blanket fuel rods are required for the design specifically described herein. The fuel rods 31 in the blanket are supported by a blanket support tube 33 disposed interiorly of the blanket assembly which also serves to define a channel within which the seed assembly moves. These blanket fuel rods are restrained by a cage structure including corner posts 34 surrounding the blanket assembly as no shell is needed around the blanket assembly.

As shown in FIG. 4, fuel rods 31 include an active portion 35 and axial blanket portions 36 and contain a plurality of fuel pellets 37 stacked inside of a hollow thin-walled cladding tube 38. The fuel rods in a seed assembly are 0.306 inch O.D. and the fuel rods in a blanket assembly are 0.571 inch O.D. The combined length of the active portion and axial blanket portions of a fuel rod 31 is 102 inches.

The specific fuel loading employed in this embodiment of the invention employs oxide pellets of fuel making use of $U^{235}$ as the fissile fuel in the seed fuel rods with $U^{238}$ as fertile material and $Pu^{239}$ as fissile fuel in the blanket fuel rods with $Th^{232}$ as fertile material. The axial end blankets for the seed fuel rods contain natural uranium dioxide and the axial end blankets for the blanket fuel rods contain $Th^{232}O_2$.

Computation of the composition of fuel needed in the seed and blanket fuel rods was carried out assuming that the fissile-bearing fuel was 97% theoretical density and that the isotopic mix of the plutonium fuel was $Pu^{239}$ 78%, $Pu^{240}$ 12%, $Pu^{241}$ 10% plus a negligible trace of $Pu^{242}$. The composition of the active portion of the fuel and blanket rods will next be given. The upper third of the active portion of the seed fuel rods is 1.458 weight percent $U^{235}$, the middle third is 2.914 weight percent $U^{235}$ and the lower third is 10.194 weight percent $U^{235}$.

Weight percent $U^{235}$ is defined as $$\frac{\text{Weight of } U^{235}}{\text{Weight of } U^{235}O_2 + \text{Weight of } U^{238}O_2}$$

The active portion of the blanket fuel rods contains plutonium distributed as follows: The innermost row of blanket fuel rods 31 contains 0.473 weight percent $Pu^{239}$, the second row contains 6.947 weight percent $Pu^{239}$ in the upper five-sixths thereof and 0.473 weight percent $Pu^{239}$ in the lower one-sixth thereof and the remaining four rows contain 2.362 weight percent $Pu^{239}$ in the upper one-third thereof, 1.655 weight percent $Pu^{239}$ in the next 1/6 thereof, 0.947 weight percent $Pu^{239}$ in the next 1/3 thereof and 0.473 weight percent $Pu^{239}$ in the bottom 1/6 thereof.

Weight percent $Pu^{239}$ is defined as $$\frac{\text{Weight of Pu}^{239}}{\text{Weight of PuO}_2 + \text{Weight of ThO}_2}$$

The fissile fuel loading of the reactor is 22 kilograms of $U^{235}$ in the seed region and 10 kilograms of $Pu^{239}$ in the blanket region of each module.

The critical positions of the movable seed of the pre-breeder design are shown on FIG. 5 as a function of core lifetime. For comparative purposes, FIG. 5 also shows the critical positions for a typical light-water breeder reactor. Since the two designs are at the same power level, FIG. 5 indicates that the pre-breeder design is capable of essentially the same power lifetime at an LWBR design.

In discussing the effectiveness of the typical pre-breeder design some figure of merit concerning the production of $U^{233}$ must be defined. The main parameter of interest is the amount of $U^{233}$ produced per net fissile atom lost over the entire core, which is defined at any time in life as:

$$C = \frac{\text{Gain Pa}^{233}(B) + \text{Gain U}^{233}(B)}{\text{Loss U}^{235}(S) - \text{Gain U}^{235}(B) + \text{Loss Pu}^{239}(B) - \text{Gain Pu}^{239}(S) + \text{Gain Pu}^{241}(S) + \text{Gain Pu}^{241}(B)}$$

where gain and loss at any time are measured from time O and (B) indicates the isotope is in the plutonium-thorium region and (S) indicates the $U^{235}$—$U^{238}$ region. The isotope $Pa^{233}$ is counted as $U^{233}$ because it will decay to $U^{233}$ with a 27.4-day half-life when removed from the core.

The table below is a partial mass balance for the typical design at 4 times in life which also shows the appropriate C values. The value of C at 15,000 EFPH is 0.641. For this typical design, with assumed 1% fabrication and reprocessing losses, 5.21 pre-breeder cycles of 15,000 EFPH each are required to produce enough $U^{233}$ for a light-water breeder reactor requiring 31.65 kg per module. Since in practice a full 6 cycles would probably be run, it would require 10.3 years to achieve a light-water breeder, but an additional 13% of 4.11 kg of $U^{233}$ would have been produced.

| | TYPICAL PRE-BREEDER FISSILE FUEL MASS BALANCE | | | | |
|---|---|---|---|---|---|
| | Effective Full Power Hours | 0 | 3000 | 9000 | 15,000 |
| SEED (Movable Region) | $U^{233}$ | .0108 | .0095 | .0079 | .0067 |
| | $U^{235}$ | 22.041 | 20.943 | 18.569 | 16.381 |
| | $Pu^{239}$ | 0 | .6044 | 1.3943 | 1.9167 |
| | $Pu^{242}$ | 0 | .0115 | .0882 | .2014 |
| | $Pa^{233}$ | 0 | .4886 | .4954 | .4816 |
| BLANKET (Stationary Region) | $U^{233}$ | 0 | 1.0984 | 3.6276 | 5.5863 |
| | $U^{235}$ | 0 | .0011 | .0118 | .0358 |
| | $Pu^{239}$ | 9.8390 | 7.9910 | 5.4596 | 3.7094 |
| | $Pu^{241}$ | 1.2720 | 1.3175 | 1.4172 | 1.4380 |
| | C | — | 0.695 | 0.664 | 0.641 |

The embodiments of the invention in which an exclusive property or privilege is claimed are defined as follows:

1. Method of producing $U^{233}$ for use in a light-water-cooled breeder reactor comprising operating a seed-and-blanket reactor containing $U^{235}$ fuel and $U^{238}$ fertile material in the seed and $Th^{232}$ fertile material in the blanket, the $Th^{232}$ being physically separated from the uranium, to produce $Pu^{239}$ in the seed and $U^{233}$ in the blanket, recovering the $Pu^{239}$ and $U^{233}$ thus produced, incorporating the $Pu^{239}$ thus produced in the blanket of a seed-and-blanket reactor along with $Th^{232}$ wherein the seed consists of $U^{235}$ and $U^{238}$, operating the reactor to produce $Pu^{239}$ in the seed and $U^{233}$ in the blanket, continuing such operation of a seed-and-blanket reactor incorporating an optimum proportion of $Pu^{239}$ therein, recovering and retaining additional amounts of $Pu^{239}$ produced, recovering and retaining $U^{233}$ so produced until enough is obtained to constitute the fissile fuel loading for a $U^{233}$ fueled light-water breeder reactor.

* * * * *